United States Patent
Ye

(10) Patent No.: US 11,452,146 B2
(45) Date of Patent: Sep. 20, 2022

(54) HANDLING TIMING CONFLICTS INVOLVING RANDOM ACCESS PROCEDURE MESSAGES

(71) Applicant: GOOGLE LLC, Mountain View, CA (US)

(72) Inventor: Shiangrung Ye, New Taipei (TW)

(73) Assignee: GOOGLE LLC, Mountain View, CA (US)

(*) Notice: Subject to any disclaimer, the term of this patent is extended or adjusted under 35 U.S.C. 154(b) by 20 days.

(21) Appl. No.: 17/085,136

(22) Filed: Oct. 30, 2020

(65) Prior Publication Data
US 2021/0160934 A1    May 27, 2021

Related U.S. Application Data

(60) Provisional application No. 62/940,363, filed on Nov. 26, 2019.

(51) Int. Cl.
*H04W 74/08*     (2009.01)
*H04L 5/00*     (2006.01)
(Continued)

(52) U.S. Cl.
CPC ....... *H04W 74/0841* (2013.01); *H04L 5/0051* (2013.01); *H04L 25/0226* (2013.01);
(Continued)

(58) Field of Classification Search
CPC ........... H04W 74/0841; H04W 74/008; H04W 74/0833; H04W 74/085; H04W 74/0875
See application file for complete search history.

(56) References Cited

U.S. PATENT DOCUMENTS

| | | | |
|---|---|---|---|
| 10,368,322 B2 | 7/2019 | Dinan | |
| 2013/0242730 A1* | 9/2013 | Pelletier | H04L 1/0046 370/230 |
| 2021/0345424 A1* | 11/2021 | Cirik | H04W 72/1263 |

FOREIGN PATENT DOCUMENTS

| | | | |
|---|---|---|---|
| KR | 2019-0095918 A | 8/2019 | |
| WO | WO-2018/175809 A1 | 9/2018 | |
| WO | WO-2018175809 A1 * | 9/2018 | ........ H04W 74/0833 |

OTHER PUBLICATIONS

3GPP TSG-RAN WG2 Meeting #105bis, published no later than Apr. 8, 2019.

(Continued)

*Primary Examiner* — Jeffrey M Rutkowski
*Assistant Examiner* — Chae S Lee
(74) *Attorney, Agent, or Firm* — Marshall, Gerstein & Borun LLP

(57) ABSTRACT

A method for handling timing conflicts associated with a random channel access procedure is implemented in a user device, and includes determining (314) that a first time span for the user device to transmit at least a data portion of a random-access procedure message to a base station overlaps a second time span for the user device to transmit another signal to the base station. The method also includes determining (320), based at least on a type of the other signal, a transmission precedence indicative of whether to modify transmission timing for the random-access procedure message or to instead modify transmission timing for the other signal, and, based on the determined transmission precedence, either transmitting (340) at least the data portion of the random-access procedure message to the base station during the first time span or transmitting (340) the other signal to the base station during the second time span.

16 Claims, 9 Drawing Sheets

(51) Int. Cl.
    *H04L 25/02*    (2006.01)
    *H04W 72/04*    (2009.01)
    *H04W 72/12*    (2009.01)
    *H04W 72/14*    (2009.01)
    *H04W 74/00*    (2009.01)

(52) U.S. Cl.
    CPC ... *H04W 72/0446* (2013.01); *H04W 72/1263* (2013.01); *H04W 72/14* (2013.01); *H04W 74/008* (2013.01)

(56) References Cited

OTHER PUBLICATIONS

Huawei et al., "Remaining Issues on the msgA Transmission," 3GPP Draft (2019).
Search Report for European Application No. 2020556.3, dated Apr. 8, 2021.
Office Action for Korean Application No. 10-2020-0158584, dated Nov. 29, 2021.
First Examination Report for India Application No. 202044050503, dated Dec. 9, 2021.
3GPP TS 38.331 v15.7.0 (Sep. 2019), "3rd Generation Partnership Project; Technical Specification Group Radio Access Network; NR; Radio Resource Control (RRC) Protocol Specification", Release 15, 527 pages.

\* cited by examiner

HANDLING TIMING CONFLICTS INVOLVING RANDOM ACCESS PROCEDURE MESSAGES

CROSS-REFERENCE TO RELATED APPLICATIONS

This claims the benefit of U.S. Provisional Patent Application No. 62/940,363, entitled "Handling Timing Conflicts Involving Random Access Procedure Messages" and filed on Nov. 26, 2019, the disclosure of which is hereby incorporated by reference herein in its entirety.

FIELD OF THE DISCLOSURE

This disclosure relates generally to wireless communications and, more particularly, to procedures for gaining access to a communication channel.

BACKGROUND

To synchronize communication over a radio interface, a user equipment ("UE") and a base station can use a random-access channel (RACH) procedure when the UE needs to transmit a signal (e.g., data or control information) to the base station. Generally speaking, a RACH procedure begins when the UE sends a random access preamble to the base station. In contention-based RACH procedures of certain radio access networks (RANs), the UE randomly selects a preamble from a predefined set of patterns or signatures. Because this selection is random, a base station can potentially receive identical preambles from two or more UEs during the same physical-layer random-access channel (PRACH) occasion, where the "PRACH occasion" is a time-frequency resource for transmitting information to the base station in the uplink direction. The base station can use additional messaging to resolve the contention between UEs transmitting identical preambles on identical PRACH occasions.

During a "four-step" contention-based RACH procedure, (1) a UE sends a random access preamble to a base station ("Msg1") on a PRACH occasion associated with the preamble; (2) the base station sends a random access response (RAR) to the UE ("Msg2"); (3) the UE sends a scheduled transmission to the base station ("Msg3") on a physical-layer uplink shared channel (PUSCH) occasion (i.e., another time-frequency resource) associated with the preamble and PRACH occasion; and (4) the base station sends a contention resolution to the UE ("Msg4"). More recently, for fifth-generation (5G) radio access ("NR") networks, a "two-step" contention-based RACH procedure has been proposed. A contention-based two-step procedure condenses steps (1) and (3) of the four-step procedure into a first step, and condenses steps (2) and (4) of the four-step procedure into a second step. Thus, in the two-step procedure, (1) a UE sends a random access preamble and a scheduled transmission to the base station ("MsgA") on PRACH and PUSCH occasions, respectively, that are associated with the preamble; and (2) the base station sends an RAR and contention resolution to the UE ("MsgB"). If the base station successfully receives and decodes the MsgA preamble during the two-step RACH procedure, but does not receive and decode information on the MsgA PUSCH occasion, the base station transmits a "fallback" response (or "fallbackRAR") to the UE, requesting that the UE fall back to the four-step random access procedure.

In some scenarios, the base station requests (e.g., configures, schedules, or grants an opportunity to) the UE to transmit other signals during a time span that overlaps the time span in which the UE intends to transmit MsgA of the two-step RACH procedure. For example, if the base station is unaware that the UE is performing a two-step RACH procedure, the base station might grant the UE a PUSCH occasion, for an uplink transmission or re-transmission of data, that includes a time span overlapping the time span in which the UE intends to transmit MsgA. As another example, the base station may request that the UE periodically or aperiodically transmit a message or other signal to the base station, such as a sounding reference signal (SRS), a message including a channel quality indication (CQI) or channel state information (CSI), or a message including a scheduling request (SR). The configured or intended transmission times of such signals may overlap the time span in which the UE intends to transmit the MsgA of a particular RACH procedure.

In some RANs such as 5G NR, however, a UE can only transmit one signal at a time. Moreover, there are currently no suitable mechanisms for resolving timing conflicts of UE transmissions during a contention-based two-step RACH procedure. Thus, a UE might degrade network efficiency by failing to transmit both intended messages/signals, or by failing to transmit a particular signal in a timely manner.

SUMMARY

A UE of this disclosure can resolve timing conflicts that involve a random-access procedure message (e.g., MsgA of the contention-based two-step RACH procedure) in a manner that helps to preserve network efficiency. In particular, the UE determines a particular transmission precedence when the intended timing of the random-access procedure message conflicts with the intended timing of another signal. The UE may "intend" a specific timing of a signal if a base station configured or scheduled the UE with that timing for the signal transmission, if the UE had scheduled the signal transmission by itself, or if the UE or a base station triggered an "immediate" (e.g., at the earliest opportunity) transmission of the signal, for example. The UE determines the transmission precedence based on the type of the other signal (e.g., uplink data signal, SRS, etc.) and, in some implementations, one or more additional factors. Based on the determined precedence, the UE modifies the transmission timing for either (1) at least a data portion of the random-access procedure message, or (2) the other signal. As used herein, "modification" of transmission timing may refer to finite time shifting (e.g., a finite delay), or to infinite time shifting (i.e., aborting or canceling the transmission).

In one such implementation, the UE determines a transmission precedence between (1) at least a data portion of the random-access procedure message and (2) an uplink data signal that the UE intends to transmit on an occasion granted by the base station. The UE may determine the transmission precedence based at least in part on whether the base station granted the occasion for the transmission of new data, or for the re-transmission of data. If the granted occasion is for new data, the UE transmits the new data on the granted occasion, and modifies (e.g., aborts, or selects a new preamble or PRACH occasion that is associated with at least one PUSCH occasion having a non-conflicting transmission time) the transmission of the random-access procedure message. For example, if the granted occasion is a PUSCH occasion, and the random-access procedure message is a MsgA of a contention-based two-step RACH procedure, then such an approach may advantageously allow the UE to transmit the new data in a contention-free manner, rather than needlessly subjecting the new data to a contention-based procedure (i.e., by instead transmitting the new data on the MsgA PUSCH occasion).

If the granted occasion is for data re-transmission, however, the UE may determine the transmission precedence based on other factors as well, including the priority level of the data being re-transmitted and the priority level of new data. If the priority level of the data being re-transmitted is lower than the priority level of the new data, for example, the UE may transmit the random-access procedure message with the original timing, and modify the timing of (e.g., abort) the re-transmission. This may be acceptable in implementations where the base station is configured to send further re-transmission requests to the UE, for example. Conversely, if the priority level of the data being re-transmitted is at least as high as the priority level of the new data, the UE may re-transmit the data on the granted occasion, and modify the timing of (e.g., delay or abort) the transmission of at least the data portion of the random-access procedure message. In some implementations, the UE may nevertheless transmit a preamble of the random-access procedure message in the originally intended time span (e.g., on the original MsgA PRACH occasion), so long as that time span does not overlap the intended time span for the data re-transmission. Transmitting the preamble but not the data portion of the random-access procedure message may cause the base station to request that the UE fall back to a four-step random-access procedure (e.g., as discussed above in the Background section and below with reference to FIG. 2C). Thus, the UE may successfully re-transmit data without causing the random-access procedure to fail entirely.

In other implementations and/or scenarios, the UE determines a transmission precedence between (1) at least a data portion of the random-access procedure message and (2) a different type of signal that is requested by the base station. For example, the other signal may be a signal that the base station configures the UE to transmit on a periodic basis, or may be a signal that the base station dynamically configures the UE to transmit aperiodically (e.g., only once or irregularly).

In one such implementation/scenario, if the other signal is an SRS, the UE always maintains the original timing of the random-access procedure message, and modifies the timing of (e.g., aborts) the SRS. For example, this may be acceptable in implementations where the base station, when not receiving a requested SRS, transmits another request for an SRS to the UE.

As another example implementation/scenario, if the other signal is a message that includes a CQI and/or CSI, the UE may determine the transmission precedence based on the quality of the communication channel between the base station and the UE. For example, if the CQI and/or CSI includes one or more channel quality metrics that have not degraded beyond a predefined threshold (or thresholds), the UE may transmit the random-access procedure message with the original timing, and modify the timing of (e.g., abort) the CQI and/or CSI message. The base station may configure the UE with the threshold(s), or the threshold(s) may otherwise be known to the base station, such that the base station can assume that the channel quality is still acceptable in scenarios where the base station does not receive an expected CQI and/or CSI from the UE. Conversely, if the metric(s) indicate(s) that the channel has degraded beyond the threshold(s), the UE may transmit the CQI and/or CSI message with the originally intended timing, and modify the timing of (e.g., delay or abort) at least the data portion of the random-access procedure message. Similar to the implementation described above, the UE may still transmit the preamble of the random-access procedure message in the original time span (e.g., on the original MsgA PRACH occasion) if that time span does not overlap the intended transmission time of the CQI and/or CSI message, thereby triggering a fall back to a four-step random-access procedure.

In other implementations, if the other signal is one of a set of particular signal types (e.g., SRS, CQI, CSI, PUSCH, or SR), the UE may determine that the other signal always has precedence over the random-access procedure message and, therefore, transmit the other signal in its originally intended time span. In one such implementation, the UE determines a new, non-conflicting time span in which to transmit the random-access procedure message. In implementations where the random-access procedure message is a MsgA of a contention-based two-step RACH procedure, for example, the UE selects a new preamble and/or a new PRACH occasion for the MsgA (e.g., the PRACH occasion that is closest in time to, but after, the original PRACH occasion without still causing a timing overlap) in response to detecting the timing conflict. Because each different preamble and PRACH occasion is associated with a different PUSCH occasion (or PUSCH occasions), the UE also, in effect, selects a new MsgA PUSCH occasion. In implementations and/or scenarios where the base station associates multiple PUSCH occasions to each preamble/PRACH occasion, the UE may select a new preamble and/or PRACH occasion for the MsgA (e.g., the PRACH occasion that is closest in time to, but after, the original PRACH occasion without still causing a timing overlap) such that at least one of the associated PUSCH occasions does not have a timing conflict with the other signal.

One example embodiment of these techniques is a method, in a user device, for handling timing conflicts associated with a random-access procedure for gaining access to a communication channel. The method includes determining, by processing hardware of the user device, that a first time span for the user device to transmit at least a data portion of a random-access procedure message to a base station overlaps a second time span for the user device to transmit another signal to the base station, and determining, by the processing hardware and based at least on a type of the other signal, a transmission precedence indicative of whether to modify transmission timing for the random-access procedure message or to instead modify transmission timing for the other signal. The method also includes, based on the determined transmission precedence, only one of (i) transmitting at least the data portion of the random-access procedure message to the base station during the first time span or (ii) transmitting the other signal to the base station during the second time span.

Another example embodiment of these techniques is a user device comprising hardware and configured to implement the method above.

DETAILED DESCRIPTION OF THE DRAWINGS

Figure 1:
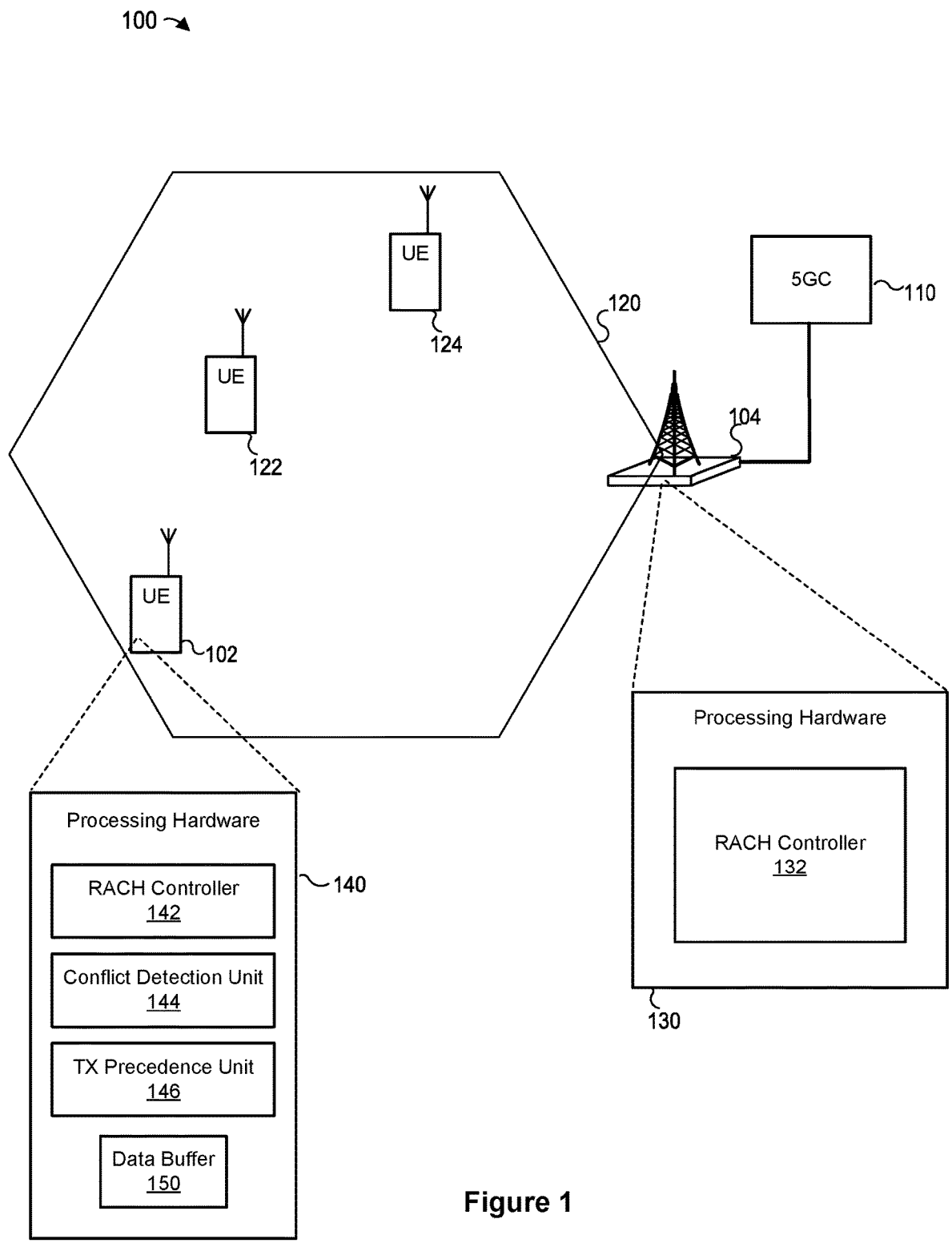
FIG. 1 illustrates an example communication system in which a UE can implement the techniques of this disclosure for handling timing conflicts associated with a random-access procedure for gaining access to a communication channel.

FIG. 1 depicts an example wireless communication network 100 in which a UE 102 synchronizes communication with a base station 104, and gains access to a channel for communicating with the base station 104, using a RACH procedure. The UE 102 and the base station 104 support one or more types of RACH procedures. In one implementation, for example, the UE 102 and the base station 104 support at least a contention-based four-step RACH procedure, a contention-based two-step RACH procedure, and a "fallback" procedure for changing from a two-step to a four-step RACH procedure (e.g., as discussed below with reference to FIGS. 2A, 2B and 2C, respectively). In another example implementation, the UE 102 and the base station 104 support only a contention-based two-step RACH procedure.

The UE 102 can be any suitable device capable of wireless communication (e.g., any of the exemplary user devices discussed below after the description of the figures). The base station 104 in this example operates as a g Node B (gNB), supports 5G New Radio (NR) radio access technology (RAT), and is connected to a core network (CN) 110 of CN type 5GC. In other implementations, however, the base station 104, and/or one or more other base stations of the wireless communication network 100, can instead (or also) operate according to RATs of types other than NR (e.g., EUTRA), and these base stations can instead (or also) be connected to CNs of CN types other than 5GC (e.g., an evolved packet core (EPC) network).

In the example implementation of FIG. 1, the base station 104 covers a 5G NR cell 120 in which other devices, such as UEs 122 and 124 for example, can operate and sometimes attempt to gain access to the same uplink channel (e.g., time-frequency resource) as the UE 102. The UEs 122 and 124 may be similar to the UE 102, for example, or may be other types of devices that are similarly able to communicate with the base station 104 via the cell 120 by using the same RACH procedure(s) as UE 102.

As illustrated in FIG. 1, the base station 104 is equipped with processing hardware 130, which can include one or more general-purpose processors (e.g., central processing units (CPUs)) and non-transitory computer-readable memory storing machine-readable instructions that are executable on the one or more general-purpose processors, and/or special-purpose processing units. The processing hardware 130 includes a RACH controller 132, which generally supports one or more RACH procedures for the base station 104. For example, the RACH controller 132 may support both two-step and contention-based four-step RACH procedures (e.g., as discussed below with reference to FIGS. 2A and 2B), as well as a procedure for "falling back" from a two-step to a four-step procedure (e.g., as discussed below with reference to FIG. 2C).

The RACH controller 132 can configure the UE 102 with a set of available time-frequency resources, from which the UE 102 can select a specific time-frequency resource to transmit a first message of the RACH procedure (e.g., MsgA or Msg1). The set of time-frequency resources may be a set of PRACH occasions each associated with a different preamble, for example, where any UE (e.g., UE 102, 122 or 124) using a particular PRACH occasion for a RACH procedure includes the corresponding preamble in the first RACH message (e.g., MsgA or Msg1). In one such implementation, the RACH controller 132 can also associate each preamble/PRACH occasion to a different PUSCH occasion (i.e., time-frequency resource for uplink data transmission), or possibly to a different set of multiple PUSCH occasions, and a UE (e.g., UE 102, 122 or 124) using a particular preamble and PRACH occasion uses the corresponding PUSCH occasion, or one occasion from the corresponding set of PUSCH occasions, to transmit or re-transmit data (e.g., in MsgA or Msg3).

The UE 102 is equipped with processing hardware 140, which can include one or more general-purpose processors (e.g., CPUs) and non-transitory computer-readable memory storing machine-readable instructions that are executable on the one or more general-purpose processors, and/or special-purpose processing units. The processing hardware 140 includes a RACH controller 142, a conflict detection unit 144, a transmission (TX) precedence unit 146, and a data buffer 150.

The RACH controller 142 generally supports one or more RACH procedures for the UE 102. For example, the RACH controller 142 may support both two-step and contention-based four-step RACH procedures (e.g., as discussed below with reference to FIGS. 2A and 2B), as well as a procedure for "falling back" from a two-step to a four-step procedure (e.g., as discussed below with reference to FIG. 2C).

The conflict detection unit 144 generally detects timing conflicts between intended (e.g., scheduled or triggered) communications. In some implementations, the UE 102 can only transmit one signal at a time, in which case the conflict detection unit 144 serves to detect a future condition that is disallowed or otherwise not possible (i.e., at least two simultaneous transmissions). At a minimum, the conflict detection unit 144 can detect timing conflicts between a RACH procedure message that the UE 102 intends to transmit (e.g., a message generated or triggered by the RACH controller 142) and another signal that the UE 102 intends to transmit, as discussed further below. In some implementations, the conflict detection unit 144 is dedicated to detecting these timing conflicts involving a RACH message, and/or the conflict detection unit 144 resides within the RACH controller 142. In other implementations, the conflict detection unit 144 is a unit that more generally detects timing conflicts for intended transmissions of the UE 102, and/or the conflict detection unit 144 is external to the RACH controller 142.

In scenarios where the conflict detection unit 144 determines that a timing conflict exists between two intended signal transmissions (e.g., a RACH procedure message and another signal), the transmission precedence unit 146 determines which signal transmission has precedence over the other. Generally, when a first signal transmission has "precedence" over a second signal transmission, the UE 102 modifies the timing of the second signal transmission but not the first signal transmission. In some implementations and/or scenarios, however, the UE 102 modifies the timing of only a portion of the second transmission signal (e.g., by maintaining the original timing for a preamble of a message, but modifying the timing for a data portion of the message, as discussed further below). Depending on the implementation and/or scenario, the transmission precedence unit 146 may determine precedence based on the type of at least one conflicting signal (e.g., whether a signal conflicting with a MsgA is a PUSCH data transmission or a PUSCH data re-transmission, or whether the conflicting signal is an SRS, etc.), based on data priority levels, based on channel quality information, and/or based on other factors, as discussed in further detail below.

The data buffer 150 resides in a memory of the UE 102, and stores data for transmission by the UE 102 (e.g., to the base station 104). The data buffer 150 may be or include a hybrid automatic repeat request (HARQ) buffer, for example. In some implementations, when the UE 102 has new data ready for transmission (e.g., data generated at an application layer, etc.), the processing hardware 140 generates a medium access control (MAC) protocol data unit (PDU), encodes the MAC PDU, and stores the encoded MAC PDU in the data buffer 150. The UE 102 transmits the encoded MAC PDU to the base station 104, via a PUSCH occasion granted by the base station 104, or a PUSCH occasion obtained via a RACH procedure (e.g., in MsgA or Msg3). If the base station 104 granted the PUSCH occasion but then fails to properly receive or decode the data, the base station 104 may request (i.e., grant the UE 102 a PUSCH occasion for) re-transmission of the data, in which case the UE 102 re-transmits the encoded MAC PDU (still stored in the data buffer 150) to the base station 104. In some implementations, the data buffer 150 represents multiple buffers (e.g., a HARQ buffer, as well as another buffer that can store data of logical channels that were not used to generate a MAC PDU).

Figure 2A:
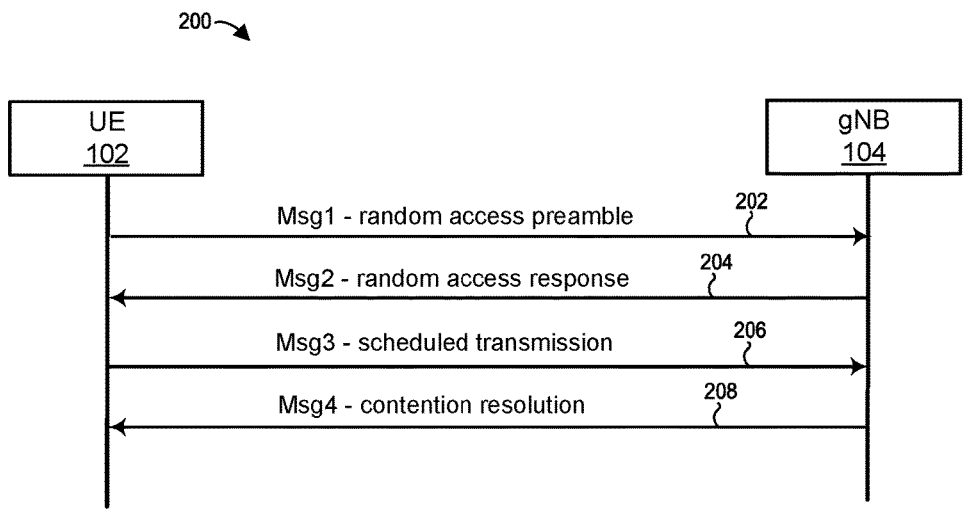
FIGS. 2A-2C are messaging diagrams of known contention-based RACH procedures.
Figure 2B:
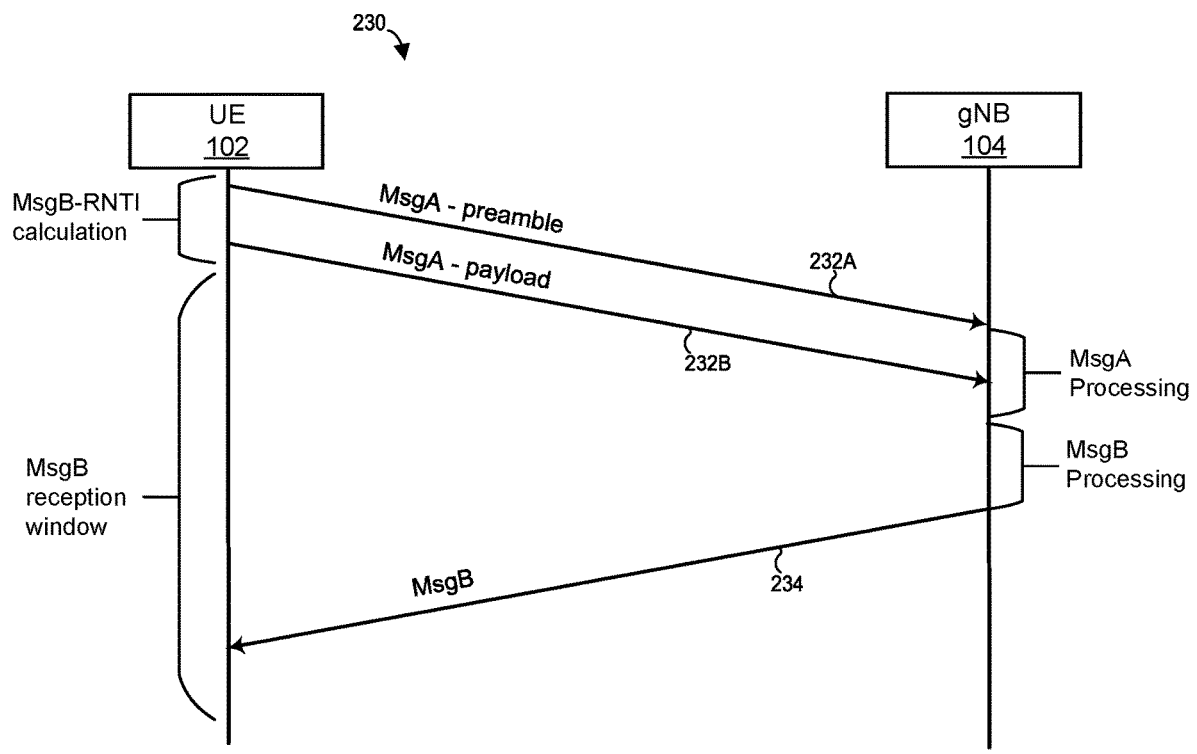
Figure 2C:
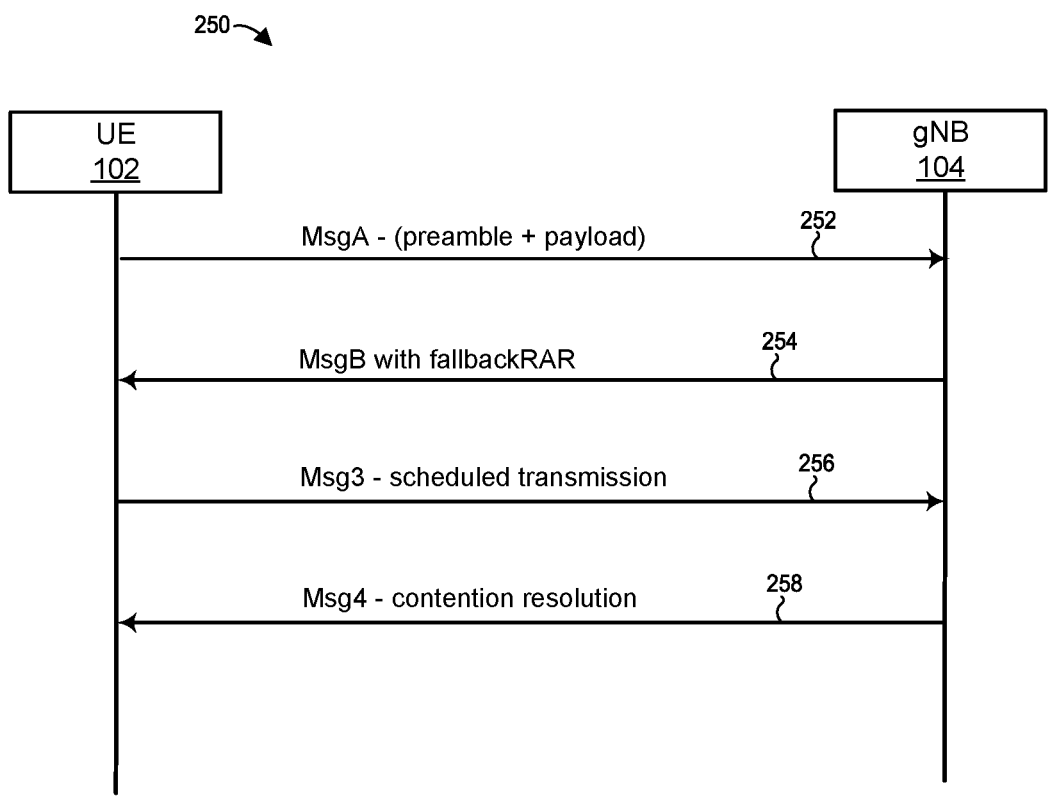

FIGS. 2A-2C illustrate examples of known RACH procedures that the UE 102 and the base station 104 can perform, in some implementations. The operations of FIGS. 2A-2C that are performed by the UE 102 may be performed by the RACH controller 142, and the operations of FIGS. 2A-2C that are performed by the base station 104 may be performed by the RACH controller 132, for example.

Referring first to FIG. 2A, a contention-based four-step RACH procedure 200 begins when the UE 102 selects a PRACH occasion, and transmits 202, on the selected PRACH occasion and to the base station 104, a random access preamble that is associated with the selected PRACH occasion ("Msg1"). The UE 102 may select the PRACH occasion from among a set of available PRACH occasions that the base station 104 had configured or indicated to the UE 102 at an earlier time, for example. The UE 102 then calculates a random access radio network temporary identifier (RA-RNTI) using the following formula:

$$RA\_RNTI = 1 + s\_id + (14 * t\_id) + (14 * 80 * f\_id) + (14 * 80 * 8 * ul\_carrier\_id),$$

where s_id is the index of the first orthogonal frequency-division multiplexing (OFDM) symbol occurring in the PRACH occasion (0≤s_id<14), t_id is the index of the first slot of the PRACH occasion in a system frame (0≤t_id<80), f_id is the index of the PRACH occasion in frequency domain (0≤f_id<8), and ul_carrier_id is the uplink (UL) carrier over which the UE 102 transmitted the random access preamble (specifically, "0" for the normal uplink (NUL) carrier and "1" for the supplementary uplink carrier (SUL)).

After the base station 104 receives the random access preamble transmitted 202 by the UE 102, the base station 104 responds by transmitting 204 a random access response (RAR) to the UE 102 ("Msg2"). Prior to the transmission 204, the base station 104 encodes the RAR such that the UE 102 can decode the RAR using the calculated RA-RNTI. The UE 102 then transmits 206 a scheduled transmission to the base station 104 ("Msg3"), and the base station 104 responds by transmitting 208 a contention resolution to the user device ("Msg4"). The UE 102 transmits Msg1 and Msg3 at different times and potentially in different frequencies (i.e., Msg1 in a PRACH occasion and Msg3 in a corresponding PUSCH occasion), with the base station 104 having configured the UE 102 at an earlier time to be able to select/use those respective time-frequency resources/occasions.

In the contention-based two-step RACH procedure 230, to more clearly illustrate timing restrictions, FIG. 2B depicts the propagation delay of messages traveling over a radio interface using slanted lines. In the procedure 230, the UE 102 transmits 232A to the base station 104 a random access preamble during a PRACH occasion associated with the preamble, and also transmits 232B to the base station 104 a payload (e.g., data) during a PUSCH occasion associated with both the preamble and the PRACH occasion. The preamble and the payload together define "MsgA." In other words, the preamble and the payload correspond to Msg1 and Msg3, respectively, of the contention-based four-step RACH procedure 200 of FIG. 2A.

As illustrated in FIG. 2B, the UE 102 calculates a MsgB-RNTI, based on the PRACH occasion during which the UE 102 transmitted 232A the preamble portion of MsgA. The base station 104 processes MsgA and generates MsgB within respective time intervals, and transmits 234 MsgB to the UE 102. The UE 102 decodes MsgB using the calculated MsgB-RNTI, if the UE 102 receives MsgB within the MsgB reception window.

FIG. 2C illustrates a "fallback" RACH procedure 250 that the UE 102 and base station 104 may implement if a contention-based two-step RACH procedure is unsuccessful. In the RACH procedure 250, the UE 102 transmits 252 a MsgA to the base station 104. While the transmission 252 of MsgA is depicted in FIG. 2C as a single line/arrow for clarity, it is understood that the transmission 252 encompasses both the preamble transmission 232A (on the PRACH occasion) and the payload transmission 232B (on the associated PUSCH occasion). In the scenario represented by FIG. 2C, however, the base station 104 successfully receives only the preamble of MsgA on the PRACH occasion, and fails to receive or decode the payload of MsgA on the associated PUSCH occasion. In response to this, the base station 104 includes a special RAR ("fallbackRAR") in MsgB, and transmits 254 the MsgB with fallbackRAR to the UE 102. The fallbackRAR causes the UE 102 to fall back to a contention-based four-step RACH procedure. Thus, in response to receiving the fallbackRAR, the UE 102 re-transmits 256 the data from the MsgA payload to the base station 104, using an uplink grant/occasion that the base station 104 indicated in the fallbackRAR. Thus, the transmission 256 may be considered to be a Msg3 of the contention-based four-step RACH procedure 200. In response to receiving this Msg3, the base station 104 transmits 258 a contention resolution to the UE 102 (i.e., Msg4 of the contention-based four-step RACH procedure 200).

Figure 3:
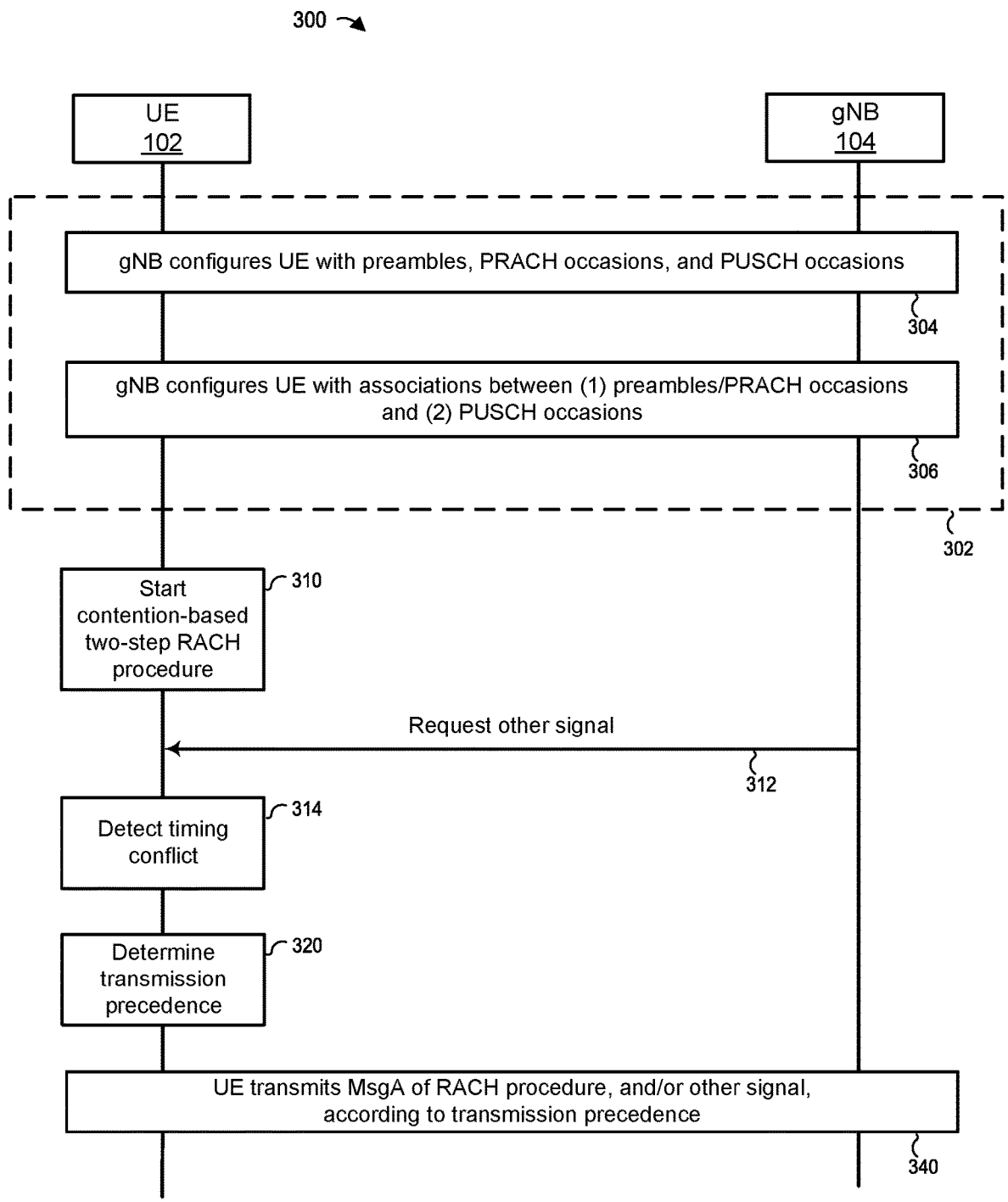
FIG. 3 is a messaging diagram of an example scenario in which a UE detects a timing conflict associated with a two-step RACH procedure message.

Next, various techniques that the UE 102 and the base station 104 can implement, to resolve/handle timing conflicts between a RACH procedure message and another signal, are discussed with reference to FIGS. 3-7. Generally speaking, the timing conflict resolution techniques discussed with reference to FIGS. 3-7 are implemented at the UE 102, by determining an appropriate precedence between the conflicting transmissions. FIG. 3 depicts a generalized implementation, while FIGS. 4 and 5 correspond to a first more specific implementation and FIGS. 6 and 7 correspond to a second more specific implementation.

While FIGS. 3-7 and/or the accompanying descriptions refer specifically to the UE 102 and the base station ("gNB") 104 of FIG. 1, it is understood that the following techniques may be implemented by other user devices and/or base stations, and/or in systems other than the wireless communication network 100 of FIG. 1.

Referring first to FIG. 3, in an example scenario 300, the base station 104 configures 302 the UE 102 with RACH information for attempting to access the base station via the cell 120. The configuring 302 includes the base station 104 configuring 304 the UE 102 with preambles, PRACH occasions and PUSCH occasions, and also configuring 306 the UE 102 with the associations between the various preambles, PRACH occasions and PUSCH occasions. In some implementations, for example, the base station 104 associates each preamble with a different PRACH occasion, and associates each preamble/PRACH occasion pair with a different PUSCH occasion (or with a different set of two or more PUSCH occasions, in some scenarios and/or implementations). The preambles, PRACH occasions and PUSCH occasions with which the base station 104 configures 304 the UE 102 may be the full set of available preambles and occasions that a UE (e.g., UE 102, 122 or 124) can select from and use when attempting to gain access to the base station 104 via the cell 120 (e.g., when using the RACH procedure 200, 230 or 250), for example. Because the base station 104 informs the UE 102 of the associations, the UE 102 need only select a PRACH occasion or a preamble to effectively select the corresponding PUSCH occasion (or corresponding subset of PUSCH occasions, if more than one PUSCH occasion is associated to each preamble/PRACH occasion pair).

The configuring 304 and 306 may occur by way of the base station 104 sending a single message to the UE 102. In different implementations and/or scenarios, for example, the configuring 302 may include the base station 104: (1) transmitting an RRCReconfiguration message to the UE 102 as a part of an RRC reconfiguration procedure (e.g., as defined in 3GPP TS 38.331 section 5.3.5); (2) transmitting an RRCSetup message to the UE 102 as a part of an RRC connection establishment procedure (e.g., as defined in 3GPP TS 38.331 section 5.3.3); (3) transmitting an RRCReestablishment message to the UE 102 as a part of an RRC reestablishment procedure (e.g., as defined in 3GPP TS 38.331 section 5.3.7); (4) transmitting an RRCResume or RRCSetup message to the UE 102 as a part of an RRC connection resume procedure (e.g., as defined in 3GPP TS 38.331 section 5.3.13); or (5) transmitting a system information block (SIB), such as a master information block (MIB) or SIB1. In each of these implementations or scenarios, the message (or SIB) includes an indication of the set of preambles and occasions available to the UE 102 for use in a RACH procedure. In other implementations, the configuring 304 and 306 occur by way of the base station 104 sending different, respective messages to the UE 102. In some implementations, the configuring 302 also includes the base station 104 configuring 302 the UE 102 in other ways (e.g., configuring 602 the UE 102 to periodically transmit CQI, CSI and/or SR messages, and/or to periodically transmit an SRS, etc.).

At some point after the base station 104 configures 302 the UE 102, the UE 102 starts 310 a contention-based two-step RACH procedure, such as the RACH procedure 230 of FIG. 2B. In other implementations, the RACH procedure is not the two-step procedure discussed above. The UE 102 may decide to start 310 the RACH procedure for various reasons, depending on the implementation and/or scenario. For example, the UE 102 may decide to start 310 the RACH procedure in response to detecting that the UE 102 has new data arriving to the data buffer 150 while the buffer 150 is empty. As another example, the UE 102 may decide to start 310 the RACH procedure in response to detecting that the UE 102 has new data arriving to the data buffer 150 at a time when the data buffer 150 stores data having a lower priority level than the new data. As still another example, the UE 102 may decide to start 310 the RACH procedure when the UE 102 decides to request that the base station 104 transmit system information to the UE 102.

Starting 310 the RACH procedure may include the UE 102 selecting a particular preamble and a corresponding PRACH occasion from the set of preambles and PRACH occasions that the base station 104 indicated when configuring 302 the UE 102. It is understood that, because the UE 102 knows the associations between preambles and PRACH occasions, the UE 102 inherently selects a preamble by selecting a PRACH occasion, and vice versa. Moreover, if a particular preamble/PRACH occasion pair is associated with only a single PUSCH occasion, the UE 102 inherently selects that PUSCH occasion by selecting the corresponding preamble or PRACH occasion.

At some point before or after the UE 102 starts 310 the RACH procedure (and possibly while, or even before, the base station 104 configures 302 the UE 102), the base station 104 requests 312 that the UE 102 transmit some other signal (i.e., a signal that is not a part of the RACH procedure started 310 by the UE 102). As used herein, the term "request" may refer to a request that the recipient (e.g., the UE 102) can optionally obey (e.g., a grant of an occasion to transmit uplink data), or a request that the UE 102 must try to obey (e.g., a command or configuration). Several specific examples are discussed in further detail below.

In some implementations and/or scenarios, the base station 104 requests 312 that the UE 102 transmit another signal by granting the UE 102 a PUSCH occasion on which the UE 102 can transmit data to the base station 104, without the UE 102 having to first perform a RACH procedure. These implementations and scenarios are discussed in further detail below with reference to FIGS. 4 and 5. In other implementations and/or scenarios, the base station 104 requests 312 that the UE 102 transmit the other signal during the configuring 302 of the UE 102. For example, the base station 104 may configure 302 the UE 102 to transmit a particular type of signal to the base station 104 on a periodic basis. As a more specific example, in addition to configuring 302 the UE 102 with RACH information, the base station 104 may configure 302 the UE 102 to periodically transmit a sounding reference signal (SRS), a message including a channel quality indication (CQI) or channel state information (CSI), or a message including a scheduling request (SR), or PUSCH. These implementations or scenarios are discussed in further detail below with reference to FIGS. 6 and 7. In still other implementations and/or scenarios, the base station 312 requests that the UE 102 transmit another signal by dynamically configuring (apart from the configuring 302) an aperiodic (e.g., one-time or irregular) transmission of a signal (e.g., a CQI and/or CSI).

After the UE 102 has started 310 the RACH procedure, and the base station 104 has requested 312 (e.g., granted a PUSCH occasion for, or configured the periodic or aperiodic transmission of) the other signal, the UE 102 detects 314 that a conflict exists between the intended timing of a message of the RACH procedure and the intended timing of the transmission of the other/requested signal. The UE 102 may detect 314 that a timing conflict exists when the transmission of at least a portion of the RACH procedure message would overlap the transmission of at least a portion of the other signal, for example. In other implementations, the UE 102 only detects 314 that a timing conflict exists if one or more additional and/or more stringent criteria are satisfied (e.g., overlap of at least a specific portion of one of the signals).

In response to detecting 314 the timing conflict, the UE 102 determines 320 a transmission precedence between the two signals with conflicting timing (i.e., the RACH procedure message and the other/requested signal). The UE 102 determines 320 the transmission precedence based on the type of at least one of the signals with conflicting timing (e.g., based on whether a signal whose intended timing conflicts with MsgA is a PUSCH data transmission or a PUSCH data re-transmission, or whether the conflicting signal is an SRS, etc.) and possibly, depending on the implementation and/or scenario, based on data priority levels, channel quality information, and/or other factors. Various more specific examples are discussed below with reference to FIGS. 4-7.

In the example shown in FIG. 3, the RACH procedure message is a MsgA of the contention-based two-step RACH procedure (e.g., procedure 200). Therefore, after the UE 102 determines 320 the transmission precedence, the UE 102 transmits 340 the MsgA, and/or the other/requested signal, to the base station 104 in accordance with the determined 320 transmission precedence. As noted above, when a first signal transmission (e.g., Msg A or the other/requested signal) has "precedence" over a second signal transmission (e.g., the other/requested signal or MsgA), the UE 102 modifies the timing of the latter (by delaying or aborting at least a portion of the transmission) but not the former. If the UE 102 determines 320 that MsgA has transmission precedence over the other signal, for example, the UE 102 may transmit 340 MsgA at the originally intended time, and delay or abort the transmission of the other signal. Conversely, if the UE 102 determines 320 that the other/requested signal has transmission precedence over MsgA, the UE 102 may transmit 340 the other/requested signal at the originally intended time, and delay or abort the transmission of MsgA (e.g., delay by selecting a new preamble/PRACH occasion that is associated with at least one PUSCH occasion having a non-conflicting transmission time). As noted above, in some implementations and/or scenarios, the UE 102 may modify the timing of only a portion of the message that does not have transmission precedence (e.g., if MsgA does not have transmission precedence, by maintaining the original timing for a preamble of MsgA but modifying the timing for a data portion of MsgA).

While not shown in FIG. 3, in some implementations and/or scenarios, the base station 104 responds to the transmission 340. For example, the base station 104 may respond to the UE 102 in a particular way (e.g., as discussed below with reference to FIGS. 4 and 5) if the base station 104 had requested/scheduled a re-transmission but instead, or also, receives a RACH message from the UE 102.

As noted above, FIG. 4 depicts a more specific example scenario 400 in which the base station 104 requests the other signal (i.e., a signal other than a RACH procedure message) by granting the UE 102 a PUSCH occasion for the transmission or re-transmission of data. In the scenario 400, the base station 104 configures 402 the UE 102 with RACH information (e.g., preambles, PRACH occasions, PUSCH occasion, and associations between the PUSCH occasions and corresponding preamble/PRACH occasion pairs) for attempting to access the base station 104 via the cell 120. The configuring 402 may be the same as the configuring 302 of FIG. 3.

At some point after the base station 104 configures 402 the UE 102, the UE 102 starts 410 a contention-based two-step RACH procedure, such as the RACH procedure 230 of FIG. 2B. In other implementations, the RACH procedure is not the two-step procedure discussed above. The starting 410 of the RACH procedure (including the trigger for starting 410 the RACH procedure) may be the same as the starting 310 of FIG. 3, for example. For instance, starting 410 the RACH procedure may include the UE 102 selecting a particular preamble and a corresponding PRACH occasion from the set of preambles and PRACH occasions that the base station 104 indicated when configuring 402 the UE 102.

At some point before or after the UE 102 starts 410 the RACH procedure, the base station 104, which may not know that the UE 102 has started 410 (or is about to start 410) the RACH procedure, requests 412 an uplink data transmission from the UE 102 by granting a PUSCH occasion for that transmission. That is, the base station 104 grants the UE 102 a time-frequency resource on which the UE 102 can transmit uplink data without first having to perform a RACH procedure to gain channel access. In some implementations, the base station 104 grants the PUSCH occasion using a downlink control indicator (DCI) via the physical downlink control channel (PDCCH). The UE 102 may scramble the cyclic redundancy check (CRC) of the DCI using the unique RNTI of the UE 102, for example, so that the UE 102 can use the RNTI to determine whether the DCI is addressed to the UE 102. The RNTI may be the cell RNTI (C-RNTI) or the configured scheduling RNTI (CS-RNTI) of the UE 102.

After the UE 102 has started 410 the RACH procedure, and the base station 104 has requested 412 (i.e., granted a PUSCH occasion for) the uplink data transmission, the UE 102 detects 414 that a conflict exists between the intended timing of a message of the RACH procedure and the intended timing of the uplink data transmission (i.e., the timing corresponding to the granted PUSCH occasion). In the example implementation of FIG. 4, the RACH message for which a timing conflict exists is a MsgA of the contention-based two-step RACH procedure. In various implementations and scenarios, the UE 102 may specifically detect 414 that the payload portion of MsgA (i.e., the portion transmitted on the PUSCH occasion associated with the preamble/PRACH occasion pair) has a timing conflict, or may more generally detect 414 that the MsgA as a whole has a timing conflict.

In response to detecting 414 the timing conflict, the UE 102 determines 420 a transmission precedence between the two signals with conflicting timing (i.e., the RACH procedure message and the uplink data transmission in the granted PUSCH occasion). After the UE 102 determines 420 the transmission precedence, the UE 102 transmits 440 the MsgA, and/or the uplink data on the granted PUSCH occasion, to the base station 104 in accordance with the determined 420 transmission precedence.

The determination 420 depends at least upon the type of the signal whose intended transmission time overlaps the intended transmission time of MsgA. In one implementation, for example, a MsgA transmission always has precedence over any uplink data transmission of a PUSCH occasion granted by the base station 104, and therefore the UE 102 determines 420 that the MsgA of the started 410 RACH procedure has transmission precedence over the requested 412 uplink data transmission.

In other implementations, however, the UE 102 also considers other factors to determine 420 transmission precedence. For example, if a requested transmission is an uplink data transmission on a granted PUSCH occasion, the UE 102 may additionally determine 420 the transmission precedence based on whether the base station 104 granted the PUSCH occasion for the transmission of new data (e.g., data for which the UE 102 must generate one or more MAC PDUs, encode the MAC PDU(s), and store the MAC PDU(s) in a HARQ buffer of data buffer 150), or instead for the re-transmission of data that the base station 104 had previously requested (e.g., data already transmitted and still stored as one or more encoded MAC PDUs within the HARQ buffer).

In one scenario, if the base station 104 granted the PUSCH occasion for the transmission of new data, the UE 102 determines 420 that the granted uplink (new) data transmission has precedence over the transmission of MsgA. This technique allows the UE 102 to avoid the RACH procedure, which may be unnecessary in view of the uplink grant. For example, the UE 102 may have started 410 the RACH procedure in order to request that the base station 104 schedule/grant an uplink transmission, specifically so that the UE 102 could transmit new data (or a buffer status report) to the base station 104. If the base station 104 already granted a PUSCH occasion for the transmission of that new data (or a buffer status report), there is no reason for the UE 102 to rely on a contention-based procedure to send the new data (or report) to the base station 104.

In other scenarios, if the base station 104 instead granted the PUSCH occasion for the re-transmission of data, the UE 102 determines 420 the transmission precedence based on both (1) the priority level of the data to be re-transmitted and (2) the priority level of the data in a particular buffer of the data buffer 150 (e.g., a buffer that stores data of logical channels that were not used to generate a MAC PDU, rather than data that is to be re-transmitted). For example, the UE 102 may determine 420 that the transmission of MsgA has precedence over the re-transmission if the data to be re-transmitted has a lower priority level than the data in the particular buffer. The UE 102 can then transmit 440 a buffer status report to the base station 104 in the MsgA PUSCH occasion, to indicate to the base station 104 that there is data in the particular buffer that has a higher priority level than the re-transmission data. In this scenario, after the base station 104 receives the MsgA, the base station 104 may send the UE 102 an uplink grant to perform a new transmission with the higher-priority data. After the base station 104 receives the higher-priority data, the base station 104 may proceed to send the UE 102 an uplink grant to request that the UE 102 perform the originally requested re-transmission.

Alternatively, the UE 102 may determine 420 that the re-transmission has precedence over the MsgA transmission if the data to be re-transmitted has a priority level that is equal to or higher than the data in a particular buffer of the data buffer 150 (e.g., a buffer that stores data of logical channels that were not used to generate a MAC PDU, rather than data that is to be re-transmitted). Moreover, if the re-transmission timing does not overlap with the MsgA preamble (i.e., does not overlap with the PRACH occasion on which the preamble is to be sent), the UE 102 can transmit both the re-transmission and the MsgA preamble with their originally intended timings (i.e., the preamble and then the re-transmission), such that only the MsgA payload is delayed or aborted. This approach may allow the RACH procedure to succeed, despite the fact that the UE 102 does not transmit a payload (e.g., buffer status report) on the MsgA PUSCH occasion. In particular, if the base station 104 successfully receives and decodes the MsgA preamble but not the MsgA payload, the base station 104 can send a fallbackRAR to the UE 102 to request that the UE 102 fall back to a four-step RACH procedure (e.g., as in procedure 250), resulting in the UE 102 having another opportunity to transmit the MsgA payload.

In some implementations, different data may be associated with different priority levels, and/or different protocol control elements (i.e., non-data control information exchanged between the UE 102 and the base station 104) may be associated with different priority levels. In one such implementation, if a particular re-transmission includes more than one data and/or control element, the UE 102 determines 420 the transmission precedence (as discussed above) using the highest priority level among the multiple data and/or control elements.

Figure 4:
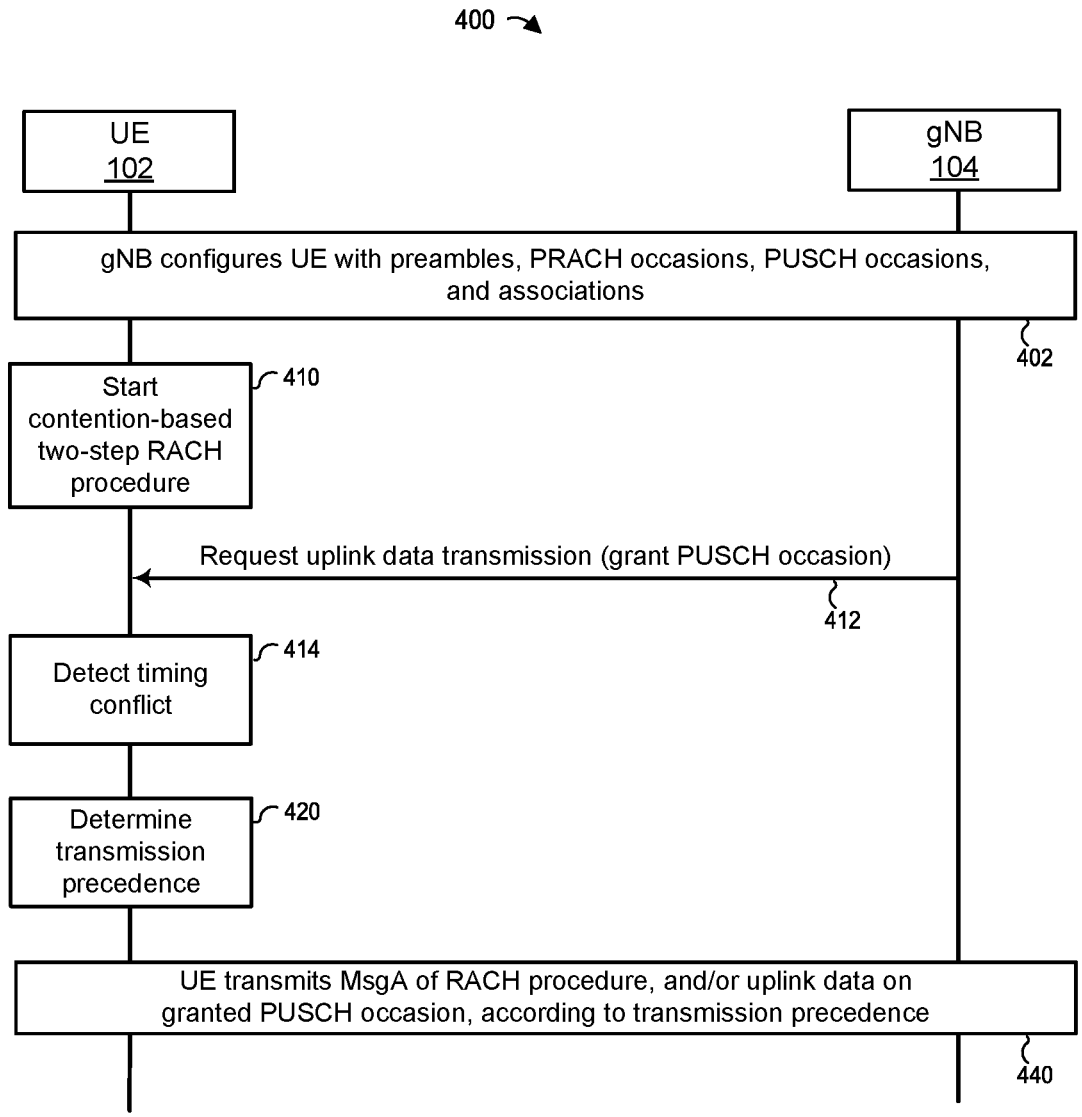
FIG. 4 is a messaging diagram of an example scenario in which a UE detects a timing conflict between a granted occasion for an uplink data transmission and a two-step RACH procedure message.

While not shown in FIG. 4, in some implementations and/or scenarios, the base station 104 responds to the transmission 440. For example, if the base station 104 scheduled a re-transmission but the UE 102 instead transmitted 440 only the MsgA to the base station 104, the base station 104 may respond by sending the UE 102 a MsgB, or a downlink assignment that is addressed to a unique RNTI (e.g., C-RNTI) of the UE 102. The base station 104 may also send the UE 102 an uplink grant to request that the UE 102 perform the originally requested re-transmission. As another example, if the base station 104 scheduled a re-transmission and the UE 102 then transmitted 440 both the MsgA preamble and the re-transmission, the base station 104 (after failing to receive the MsgA payload on the corresponding PUSCH occasion) may transmit a MsgB containing a fallbackRAR to the UE 102 (e.g., as in the procedure 250). When the UE 102 receives the fallbackRAR, the UE 102 transmits the MsgA payload to the base station 104 on the PUSCH occasion. When the base station 104 successfully receives the MsgA payload, the base station 104 transmits a Msg4 to the UE 102. The base station 104 may address the Msg4 to the unique RNTI (e.g., C-RNTI) of the UE 102, for example.

Figure 5:
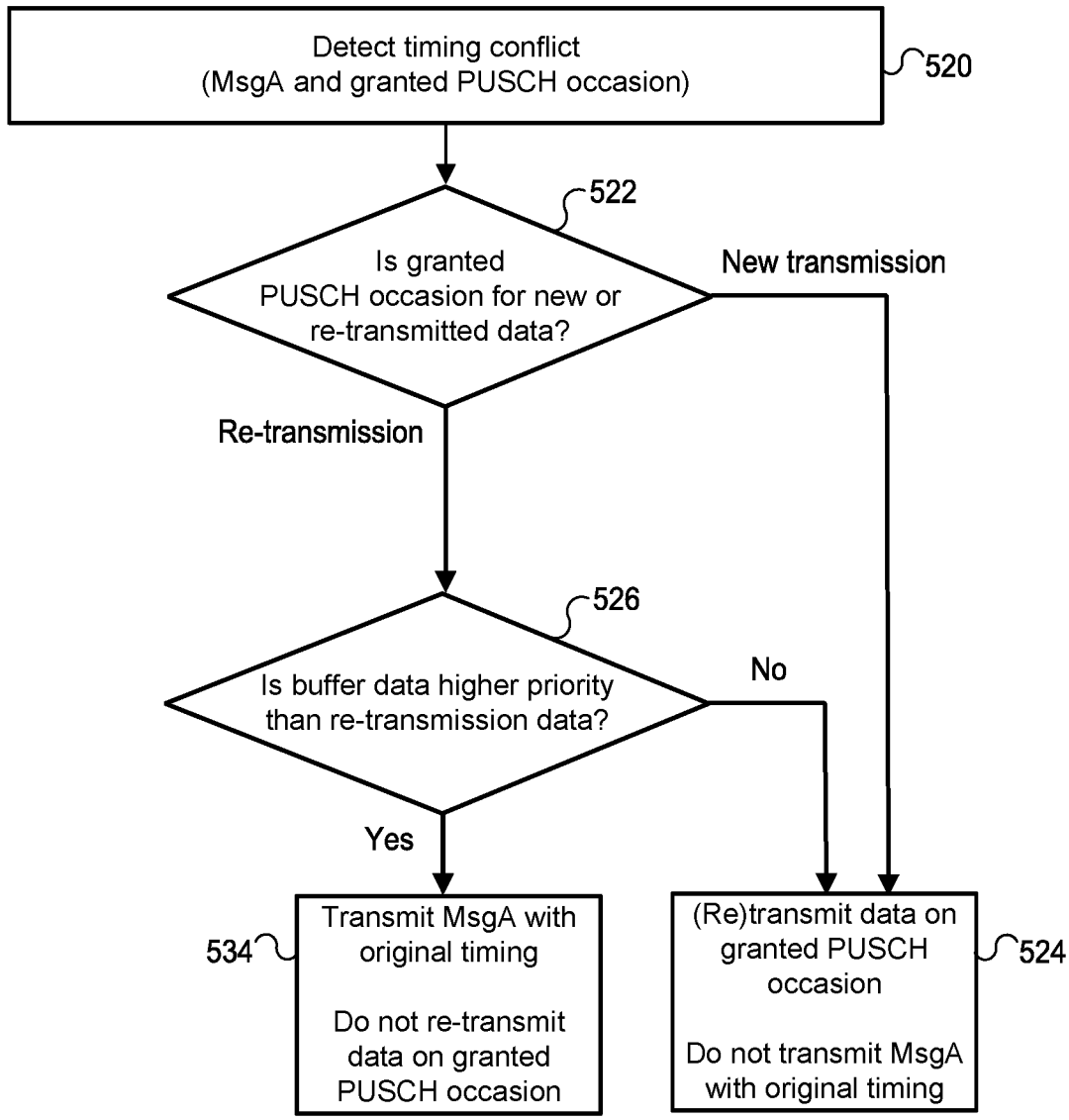
FIG. 5 is a flow diagram of an example algorithm that the UE may implement when detecting a timing conflict between a granted occasion for an uplink data transmission and a two-step RACH procedure message.

FIG. 5 is a flow diagram of an example algorithm 500 that the UE 102 may implement when detecting a timing conflict between a granted occasion for an uplink data transmission and a contention-based two-step RACH procedure message. The UE 102 may implement the algorithm 500 to perform the UE-side operations of the messaging diagram shown in FIG. 4.

In the algorithm 500, at block 520, the UE 102 detects a timing conflict between a MsgA and a granted PUSCH occasion. Block 520 may correspond to event 414 of FIG. 4, for example. The UE 102 then determines, at block 522, whether the granted PUSCH occasion is for new or re-transmitted data. If the granted PUSCH occasion is for new data, the UE 102 transmits the new data on the granted PUSCH occasion, at block 524, and does not transmit MsgA with its original timing (e.g., delays or aborts the transmission of MsgA). If the granted PUSCH occasion is instead for a re-transmission, the UE 102 determines, at block 526, whether new data in a buffer is higher priority than the data to be re-transmitted, as discussed above. If the new data is not higher priority, the UE 102 re-transmits the data on the granted PUSCH occasion, at block 524, and does not transmit MsgA (or at least, does not transmit the payload/data portion of MsgA) with its original timing. If the new data is higher priority, however, the UE 102 transmits MsgA with its original timing at block 534, and does not re-transmit the data on the granted PUSCH occasion. Blocks 522 and/or 526 may correspond to event 420 of FIG. 4, and block 524 or block 534 may correspond to event 440, for example.

Figure 6:
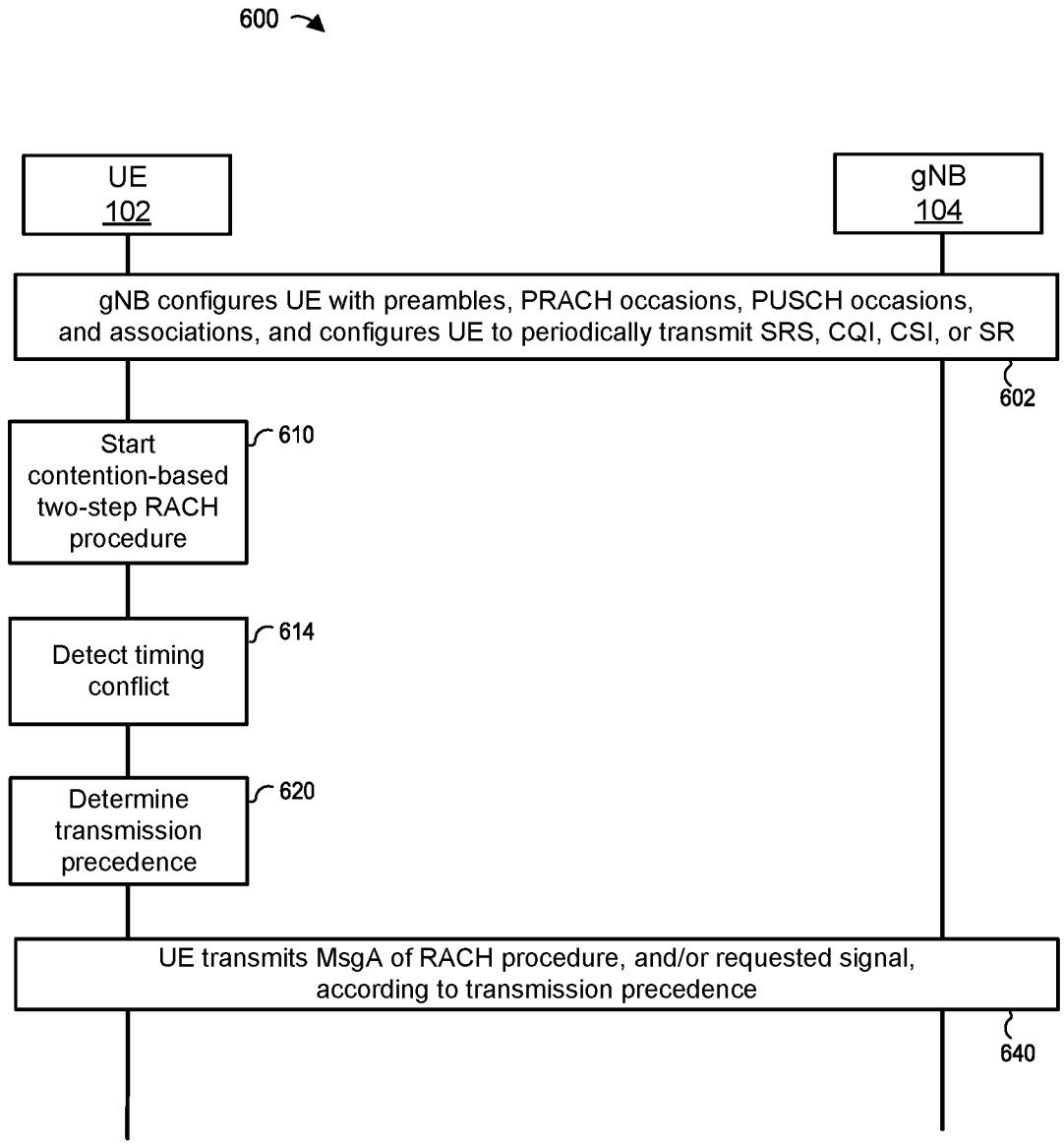
FIG. 6 is a messaging diagram of an example scenario in which a UE detects a timing conflict between a requested SRS, CQI, SCI or SR signal and a two-step RACH procedure message.

FIG. 6 depicts an example scenario 600 in which the base station 104 requests the other signal (i.e., a signal other than a RACH procedure message) by configuring the UE 102 to send that signal to the base station 104 on a periodic basis. In the scenario 600, the base station 104 configures 602 the UE 102 with RACH information (e.g., preambles, PRACH occasions, PUSCH occasion, and associations between the PUSCH occasions and corresponding preamble/PRACH occasion pairs) for attempting to access the base station 104 via the cell 120. The configuring 602 also includes the base station 104 configuring 602 the UE 102 to periodically transmit a message including a CQI, CSI or SR, or to periodically transmit an SRS or PUSCH. The configuring 602 may be the same as the configuring 302 of FIG. 3.

At some point after the base station 104 configures 602 the UE 102, the UE 102 starts 610 a contention-based two-step RACH procedure, such as the RACH procedure 230 of FIG. 2B. In other implementations, the RACH procedure is not the two-step procedure discussed above. The starting 610 of the RACH procedure (including the trigger for starting 610 the RACH procedure) may be the same as the starting 310 of FIG. 3, for example. For instance, starting 610 the RACH procedure may include the UE 102 selecting a particular preamble and a corresponding PRACH occasion from the set of preambles and PRACH occasions that the base station 104 indicated when configuring 602 the UE 102.

At some point after the UE 102 starts 610 the RACH procedure, the UE 102 detects 614 that a conflict exists between the intended timing of a message of the RACH procedure and the intended timing of the SRS, CQI, CSI, PUSCH, or SR signal. In the example implementation of FIG. 6, the RACH message for which a timing conflict exists is a MsgA of the contention-based two-step RACH procedure. In various implementations and scenarios, the UE 102 may specifically detect 614 that the payload portion of MsgA (i.e., the portion transmitted on the PUSCH occasion associated with the preamble/PRACH occasion pair) has a timing conflict, or may more generally detect 614 that the MsgA as a whole has a timing conflict.

In response to detecting 614 the timing conflict, the UE 102 determines 620 a transmission precedence between the two signals with conflicting timing (i.e., the RACH procedure message and the SRS, CQI, CSI, PUSCH, or SR signal). After the UE 102 determines 620 the transmission precedence, the UE 102 transmits 640 the MsgA, and/or the SRS, CQI, CSI or SR signal, to the base station 104 in accordance with the determined 620 transmission precedence.

The determination 620 depends at least upon the type of the signal whose intended transmission time overlaps the intended transmission time of MsgA. In some implementations, for example, an SRS, CQI, PUSCH, or CSI signal transmission always has precedence over a MsgA transmission, and therefore the UE 102 determines 620 that the SRS, CQI, PUSCH, or CSI has transmission precedence over the MsgA of the RACH procedure. In these implementations, the UE 102 selects another preamble or PRACH occasion in response to detecting 614 the timing conflict. For example, the UE 102 may select the PRACH occasion that is (1) closest in time to (and after) the original PRACH occasion, and (2) associated with at least one PUSCH occasion that does not have a timing conflict with the original SRS, CQI, PUSCH, or CSI transmission time. Thus, the event 640 may include transmitting the SRS, CQI, PUSCH, or CSI signal with the originally intended timing, and then transmitting the MsgA of the RACH procedure at a time later than its originally intended timing (i.e., at a time corresponding to the newly selected PRACH occasion, as well as the corresponding PUSCH occasion).

In an alternative implementation, Msg A always has transmission precedence over an SRS signal. Thus, when the UE 102 detect 614 a timing conflict between the MsgA and an SRS signal, the UE 102 determines 620 that the MsgA has transmission precedence, and transmits 640 MsgA, but not the SRS signal, with the originally intended timing. For example, the UE 102 may abort the transmission of the SRS signal. In this implementation, because the base station 104 does not receive the SRS according to the scheduled/configured timing, the base station 104 sends a command to request the UE 102 to transmit an SRS (e.g., a request for an aperiodic SRS transmission).

In another alternative implementation, a CQI and/or CSI message may or may not have transmission precedence over MsgA, depending on a measured state or quality of the communication channel (e.g., uplink channel) between the UE 102 and the base station 104. In this implementation, if the UE 102 determines that one or more channel quality metrics have not degraded beyond some acceptable threshold(s), the UE 102 may determine 620 that the MsgA has transmission precedence over the scheduled CQI/CSI transmission/report, and abort the CQI/CSI transmission. Conversely, if the UE 102 determines that the metric(s) have degraded beyond the threshold(s), the UE 102 may determine that the scheduled CQI/CSI transmission/report has precedence over the MsgA transmission. In both of these implementations, the base station 104 may configure (e.g., at event 602) the UE 102 with the applicable threshold(s). Thus, if the base station 104 does not receive the scheduled CQI/CSI transmission, the base station 104 can assume that the CQI/CSI metric(s) have not degraded beyond the configured threshold(s).

In other implementations and/or scenarios, an SR signal has transmission precedence over a MsgA. If the UE 102 has new data to send, for example, the UE 102 may transmit an SR to the base station 104, to request that the base station 104 schedule an uplink transmission. In this implementation and scenario, if the UE 102 detects 614 that the intended transmission time of a MsgA (e.g., the PUSCH occasion of the MsgA) overlaps with the intended transmission time of the SR, the UE 102 determines 620 that the SR has transmission precedence and transmits 640 the SR, but not the MsgA, with the originally intended timing. The UE 102 also selects another preamble or PRACH occasion in response to detecting 614 the timing conflict. For example, the UE 102 may select the PRACH occasion that is (1) closest in time to (and after) the original PRACH occasion, and (2) associated with at least one PUSCH occasion that does not have a timing conflict with the original SR transmission time.

Figure 7:
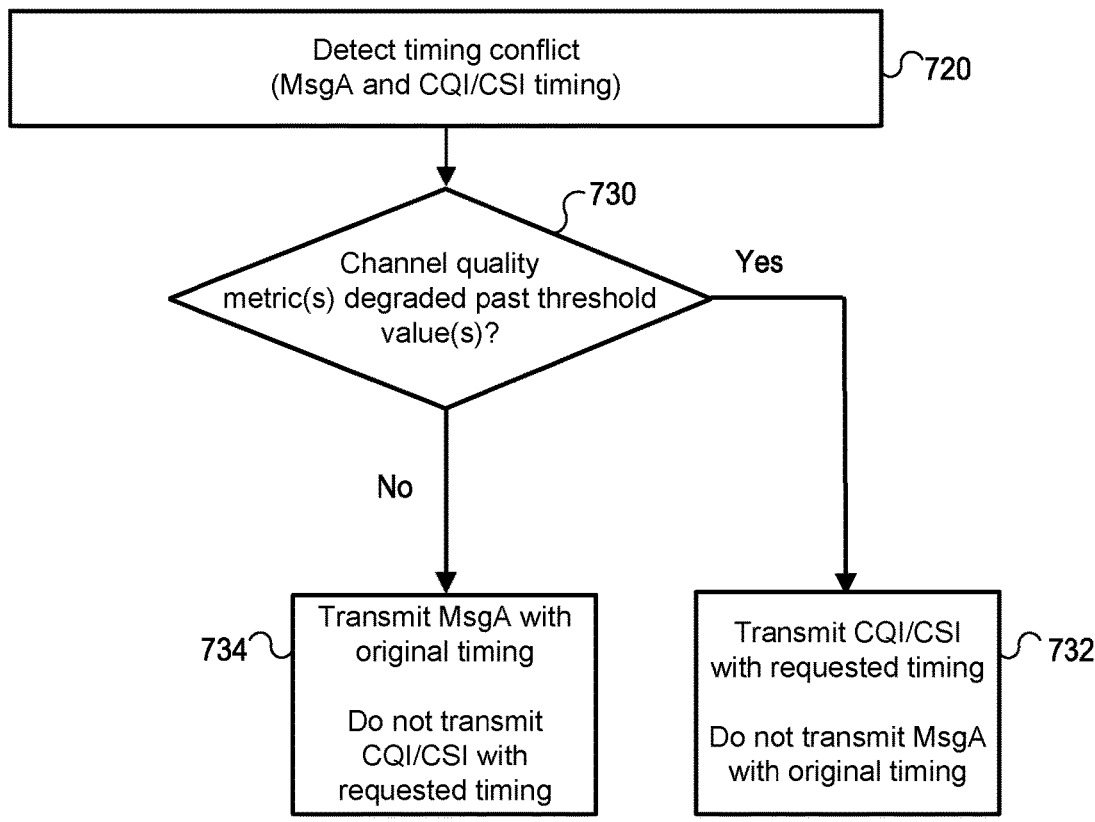
FIG. 7 is a flow diagram of an example algorithm that the UE may implement when detecting a timing conflict between a requested SRS, CQI, SCI or SR signal and a two-step RACH procedure message.

FIG. 7 is a flow diagram of an example algorithm 700 that the UE 102 may implement when detecting a timing conflict between an intended (e.g., configured/scheduled) CQI and/or CSI transmission and a two-step RACH procedure message. The UE 102 may implement the algorithm 700 to perform the UE-side operations of the messaging diagram shown in FIG. 6, for example.

In the algorithm 700, at block 720, the UE 102 detects a timing conflict between MsgA and an intended CQI/CSI transmission. Block 720 may correspond to event 614 of FIG. 6, for example. The UE 102 then determines, at block 730, whether one or more channel quality metrics have degraded past one or more predefined (e.g., configured or fixed) thresholds. If the channel quality metric(s) have degraded past the threshold(s), the UE 102 transmits the CQI/CSI to the base station 104 with the requested (e.g., configured/scheduled) timing at block 732, and does not transmit MsgA (or at least the data/payload portion thereof) with the originally intended timing. Conversely, if the channel quality metric(s) have not degraded past the threshold(s), the UE 102 transmits MsgA to the base station 104 with the original timing at block 734, and does not transmit the CQI/CSI to the base station 104 with the original/requested timing. Block 730 may correspond to event 620 of FIG. 6, and block 732 or block 734 may correspond to event 640, for example.

Other variations of the implementation shown in FIG. 3 (i.e., other than those shown in FIGS. 4-7) are also possible. In some implementations, for example, the base station 104 may dynamically request (e.g., at event 412) that the UE 102 perform an aperiodic (single or irregular) CQI or CSI transmission, by transmitting to the UE 102 a command (e.g., in a DCI or MAC control element). If the UE 102 determines (e.g., within the determination 420) that one or more channel quality metrics have not degraded beyond some acceptable threshold(s), the UE 102 may determine that the MsgA has transmission precedence over the aperiodic CQI/CSI transmission.

Conversely, if the UE 102 determines that the metric(s) have degraded beyond the threshold(s), the UE 102 may determine that the aperiodic CQI/CSI transmission/report has precedence over the MsgA transmission. However, if the intended timing of the aperiodic CQI/CSI transmission does not overlap the intended timing of MsgA preamble, the UE 102 may also determine to transmit the MsgA preamble with its original timing. In these implementations, the base station 104 may configure (e.g., at event 402) the UE 102 with the applicable threshold(s). Thus, if the base station 104 does not receive the aperiodic CQI/CSI transmission, the base station 104 can assume that the channel quality metric(s) have not degraded beyond the configured threshold(s).

In any of the implementations discussed above, the UE 102 may treat failed RACH procedures differently depending on whether the failure of the RACH procedure was due to a timing conflict resolution using one of the techniques described herein. For example, each time that the UE 102 fails to receive an expected RACH procedure message from a base station (e.g., Msg B in procedure 230, or Msg2 and/or Msg4 in procedure 200), the UE 102 may typically respond by increasing a preamble transmit power, and also increasing a preamble transmit counter by one. The UE 102 can then use the counter value to detect transmit problems. For example, if the counter exceeds a threshold, the UE 102 may take an action to resolve or handle the problem, such as performing a radio link failure procedure to select another cell. In some implementations, however, when the UE 102 is performing a contention-based two-step procedure and determines (e.g., at event 320, 420 or 620) that the non-RACH signal has transmission precedence and therefore selects a new preamble/PRACH occasion, the UE 102 instead: (1) maintains (does not increase) the preamble transmit power, and (2) maintains (does not increment) the preamble transmit counter.

Figure 8:
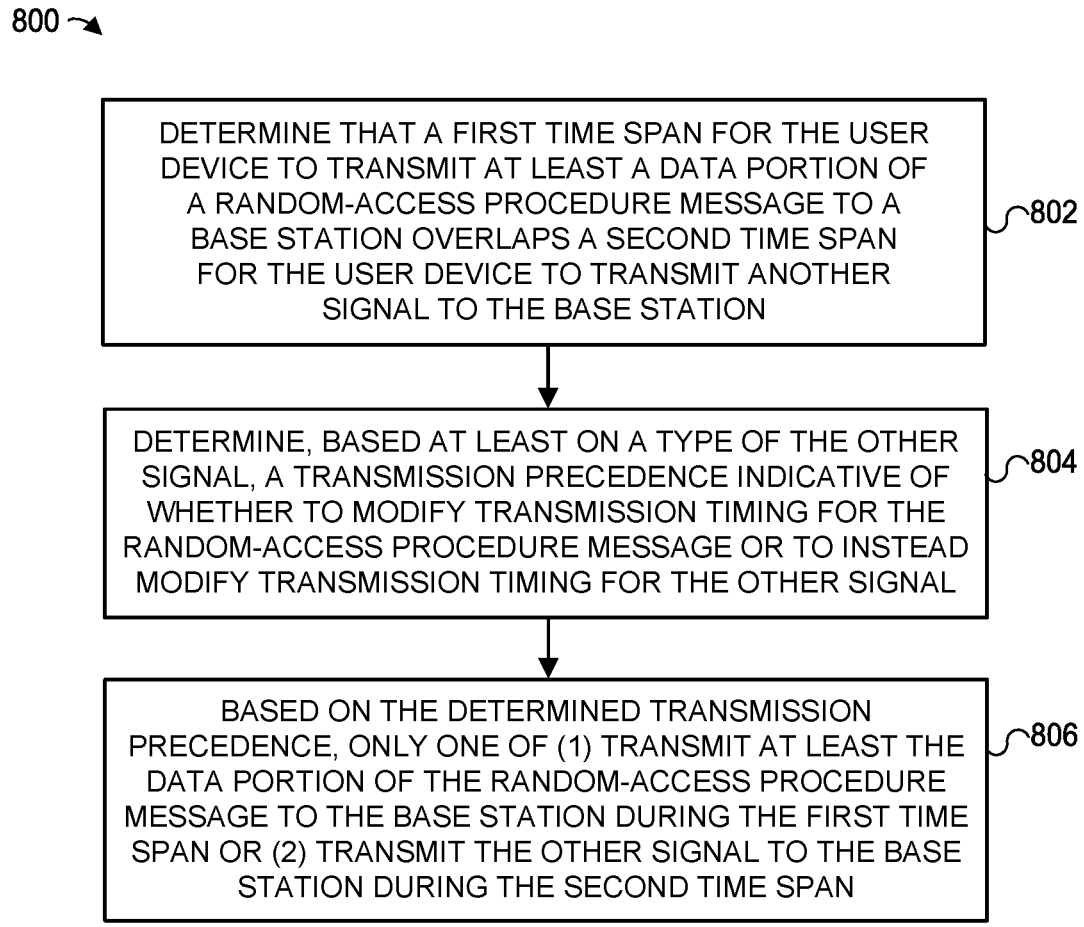
FIG. 8 is a flow diagram of an example method for handling timing conflicts associated with a random-access procedure for gaining access to a communication channel, which can be implemented in a UE.

FIG. 8 is a flow diagram of an example method 800 for handling timing conflicts associated with a random-access procedure (e.g., RACH procedure 230 or 250) for gaining access to a communication channel, which can be implemented in a user device such as the UE 102 of FIG. 1, for example.

At block 802, the user device determines (e.g., at event 314, 414 or 614, or at block 520 or 720) that a first time span overlaps a second time span, where the first time span is a time span for the user device to transmit at least a data portion of a random-access procedure message (e.g., at least the payload portion of MsgA of procedure 230 or 250) to a base station, and where the second time span is a time span for the user device to transmit another signal (e.g., an uplink data transmission on a granted PUSCH occasion, a configured periodic CQI, CSI, SR, PUSCH, or SRS, or a dynamically configured/aperiodic CQI or CSI, etc.) to the base station.

At block 804, the user device determines (e.g., at event 320, 420 or 620, or at blocks 522 and 526, or at block 730), based at least on a type of the other signal, a transmission precedence indicative of whether to (1) modify the transmission timing for the random-access procedure message, or instead (2) modify the transmission timing for the other signal. As noted above, "modifying" a transmission timing can include delaying the transmission, or aborting/canceling the transmission entirely.

At block 806, based on the determined transmission precedence, the user device either transmits (e.g., at event 340, 440 or 640, at block 534, or at block 734) at least the data portion of the random-access procedure message to the base station during the first time span, or instead transmits (e.g., at event 340, 440 or 640, at block 524, or at block 732) the other signal to the base station during the second time span.

By way of example, and not limitation, the disclosure herein contemplates at least the following aspects:

Aspect 1—A method in a user device for handling timing conflicts associated with a random-access procedure for gaining access to a communication channel, the method comprising: determining, by processing hardware of the user device, that a first time span for the user device to transmit at least a data portion of a random-access procedure message to a base station overlaps a second time span for the user device to transmit another signal to the base station; determining, by the processing hardware and based at least on a type of the other signal, a transmission precedence indicative of whether to modify transmission timing for the random-access procedure message or to instead modify transmission timing for the other signal; and based on the determined transmission precedence, only one of (i) transmitting at least the data portion of the random-access procedure message to the base station during the first time span or (ii) transmitting the other signal to the base station during the second time span.

Aspect 2—The method of aspect 1, wherein the method further comprises, prior to determining that the first time span overlaps the second time span, receiving, from the base station, a message that grants the user device an occasion to transmit uplink data, the granted occasion including the second time span.

Aspect 3—The method of aspect 2, wherein: the message that grants the user device the occasion to transmit uplink data indicates that the granted occasion is an occasion for the user device to transmit new data to the base station; determining the transmission precedence is based at least on (i) the other signal being an uplink data signal, and (ii) the granted occasion being an occasion for the user device to transmit new data; and the method comprises, based on the determined transmission precedence, transmitting the uplink data signal to the base station during the second time span.

Aspect 4—The method of aspect 2, wherein: the message that grants the user device the occasion to transmit uplink data indicates that the granted occasion is an occasion for the user device to re-transmit data that the base station failed to receive or decode; and determining the transmission precedence is based at least on (i) the other signal being an uplink data signal, (ii) the granted occasion being an occasion for the user device to re-transmit data, (iii) a priority level of data to be transmitted in the data portion of the random-access procedure message, and (iv) a priority level of the data to be re-transmitted.

Aspect 5—The method of aspect 4, wherein: determining the transmission precedence includes determining to transmit the uplink data signal during the second time span based on the priority level of the data to be re-transmitted being at least as high as the priority level of the data to be transmitted in the data portion of the random-access procedure message; and the method comprises transmitting the uplink data signal to the base station during the second time span.

Aspect 6—The method of any of aspects 1-5, further comprising: determining, by the processing hardware, that a third time span for the user device to transmit a preamble of the random-access procedure message to the base station does not overlap the second time span; and in response to determining that the third time span does not overlap the second time span, transmitting the preamble to the base station during the third time span.

Aspect 7—The method of aspect 4, wherein: determining the transmission precedence includes determining to transmit at least the data portion of the random-access procedure message during the first time span based on the priority level of the data to be re-transmitted being lower than the priority level of the data to be transmitted in the data portion of the random-access procedure message; and the method comprises transmitting at least the data portion of the random-access procedure message to the base station during the first time span.

Aspect 8—The method of any one of aspects 2-7, further comprising: prior to determining that the first time span overlaps the second time span, selecting, by the processing hardware, a preamble, or a physical-layer random-access channel (PRACH) occasion, associated with the first time span; and determining, by the processing hardware, that the first time span overlaps the second time span includes determining that the selected preamble or the selected PRACH occasion is associated with a first physical-layer uplink channel (PUSCH) occasion that includes the first time span, wherein receiving the message that grants the user device the occasion to transmit uplink data includes receiving a message that grants the user device an occasion to transmit uplink data on a second PUSCH occasion that includes the second time span.

Aspect 9—The method of aspect 1, comprising, based on the determined transmission precedence, transmitting the other signal during the second time span, and further comprising: selecting, by the processing hardware, a third time span for transmitting the random-access procedure message; and transmitting at least the data portion of the random-access procedure message during the third time span.

Aspect 10—The method of aspect 9, further comprising: prior to determining that the first time span overlaps the second time span, selecting, by the processing hardware, a first preamble, or a first physical-layer random-access channel (PRACH) occasion, associated with the first time span, wherein selecting the third time span includes selecting a second preamble, or a second PRACH occasion, associated with the third time span, and wherein transmitting at least the data portion of the random-access procedure message includes transmitting the second preamble on the second PRACH occasion.

Aspect 11—The method of aspect 10, wherein: determining that the first time span overlaps the second time span includes determining that the selected first preamble or the selected first PRACH occasion is associated with a first physical-layer uplink channel (PUSCH) occasion that includes the first time span; determining that the selected second preamble or second PRACH occasion is associated with a second PUSCH occasion that includes the third time span; and transmitting at least the data portion of the random-access procedure message includes transmitting the second preamble on the second PRACH occasion and transmitting the data portion of the random-access procedure message on the second PUSCH occasion.

Aspect 12—The method of aspect 10 or 11, comprising: prior to selecting the first preamble or the first PRACH occasion, receiving, from the base station, an indication of (i) a set of available preambles that includes the first preamble and the second preamble, and (ii) a set of available PRACH occasions that includes the first PRACH occasion and the second PRACH occasion.

Aspect 13—The method of any one of aspects 9-12, further comprising: prior to determining that the first time span overlaps the second time span, receiving, from the base station, a request to transmit the other signal during the second time span.

Aspect 14—The method of aspect 13, wherein determining the transmission precedence is based at least on the other signal being a sounding reference signal.

Aspect 15—The method of aspect 13, wherein determining the transmission precedence is based at least on the other signal being a message including one or more metrics indicating a quality or state of the communication channel.

Aspect 16—The method of aspect 13, wherein determining the transmission precedence is based at least on the other signal being a message including a scheduling request.

Aspect 17—The method of aspect 1, wherein: determining the transmission precedence is based at least on the other signal being a sounding reference signal; and the method comprises, based on the determined transmission precedence, transmitting at least the data portion of the random-access procedure message during the first time span.

Aspect 18—The method of aspect 1, wherein determining the transmission precedence is based at least on (i) the other signal being a message including one or more metrics indicating a quality or state of the communication channel and (ii) the one or more metrics.

Aspect 19—The method of aspect 18, wherein determining the transmission precedence includes comparing at least one of the one or more metrics to a predefined threshold.

Aspect 20—The method of any one of aspects 17-19, wherein: the method further comprises, prior to determining that the first time span overlaps the second time span, selecting a preamble, or a physical-layer random-access channel (PRACH) occasion, associated with the first time span; the PRACH occasion includes a third time span prior to the first time span; and determining that the first time span overlaps the second time span includes determining that the selected preamble or the selected PRACH occasion is associated with a physical-layer uplink channel (PUSCH) occasion that includes the first time span.

Aspect 21—The method of aspect 20, further comprising: determining, by the processing hardware, that the third time span does not overlap the second time span, wherein the method comprises, based on the determined transmission precedence, transmitting the preamble to the base station on the PRACH occasion, not transmitting the data portion of the random-access procedure message to the base station on the PUSCH occasion, and transmitting the other signal to the base station during the second time span.

Aspect 22—The method of aspect 1, wherein: the method comprises, based on the determined transmission precedence, (i) transmitting the other signal during the second time span, (ii) not transmitting the data portion of the random-access procedure message during the first time span, and (iii) not transmitting a preamble of the random-access procedure message before the first time span; and the method further comprises overriding, by the processing hardware, one or more actions associated with unsuccessful iterations of the random-access procedure, the one or more actions including one or both of (i) increasing a preamble transmit power and (ii) incrementing a message transmission counter.

Aspect 23—The method of any one of aspects 1-22, wherein: the random-access procedure is a contention-based two-step random-access channel (RACH) procedure; and the random-access procedure message is a message associated with a first step of the contention-based two-step RACH procedure.

Aspect 24—A user device comprising hardware and configured to implement the method of any one of aspects 1-23.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling timing conflicts involving RACH procedure messages through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a user device for handling timing conflicts associated with a random-access procedure for gaining access to a communication channel, the method comprising:
   receiving, from a base station, a message that grants the user device an occasion to transmit uplink data, the occasion including a second time span configured for the user device to transmit uplink data to the base station;
   determining, by processing hardware of the user device, that a first time span for the user device to transmit at least a data portion of a random-access procedure message to the base station overlaps the second time span;
   determining, by the user device, a transmission precedence, wherein determining the transmission precedence is based at least on whether the granted occasion is (i) an occasion for the user device to re-transmit data or (ii) an occasion for the user device to transmit new data; and
   based on the determined transmission precedence, only one of (i) transmitting at least the data portion of the random-access procedure message to the base station during the first time span or (ii) transmitting the uplink data to the base station during the second time span.

2. The method of claim 1,
   wherein the message that grants the user device an occasion to transmit uplink data configures resources for the user device to transmit uplink communications, and wherein the resources include the second time span.

3. The method of claim 1, wherein:
the message that grants the user device the occasion to transmit uplink data is a message that grants an occasion for the user device to re-transmit data that the base station failed to receive or decode; and
determining the transmission precedence is based at least on the granted occasion being an occasion for the user device to re-transmit data.

4. The method of claim 3, comprising:
based on the determined transmission precedence, transmitting at least the data portion of the random-access procedure message to the base station during the first time span.

5. The method of claim 1, wherein:
the message that grants the user device the occasion to transmit uplink data is a message that grants an occasion for the user device to transmit new data; and
determining the transmission precedence is based at least on the granted occasion being an occasion for the user device to transmit new data.

6. The method of claim 5, comprising:
based on the determined transmission precedence, transmitting the uplink data to the base station during the second time span.

7. A method in a user device for handling timing conflicts associated with a random-access procedure for gaining access to a communication channel, the method comprising:
selecting, by processing hardware of the user device, a preamble, or a physical-layer random-access channel (PRACH) occasion, associated with a first time span for the user device to transmit at least a data portion of a random-access procedure message to a base station;
receiving, from the base station, a message that grants the user device an occasion to transmit uplink data to the base station on a second physical-layer uplink channel (PUSCH) occasion that includes a second time span;
determining, by the processing hardware, that the first time span overlaps the second time span, at least in part by determining that the selected preamble or the selected PRACH occasion is associated with a first PUSCH occasion that includes the first time span,
determining, by the user device and based at least on the granted occasion being an occasion for the user device to transmit uplink data, a transmission precedence; and
based on the determined transmission precedence, only one of (i) transmitting at least the data portion of the random-access procedure message to the base station during the first time span or (ii) transmitting the uplink data to the base station during the second time span.

8. The method of claim 7, wherein:
selecting the preamble, or the PRACH occasion, associated with the first time span includes selecting the preamble associated with the first time span; and
determining that the first time span overlaps the second time span includes determining that the selected preamble is associated with the first PUSCH occasion that includes the first time span.

9. The method of claim 7, comprising:
prior to selecting the preamble or the PRACH occasion, receiving, from the base station, an indication of (i) a set of available preambles that includes the preamble, and (ii) a set of available PRACH occasions that includes the PRACH occasion.

10. A method in a user device for handling timing conflicts associated with a random-access procedure for gaining access to a communication channel, the method comprising:
receiving, from a base station, a message that grants the user device an occasion to transmit uplink data, the occasion including a second time span;
determining, by processing hardware of the user device, that a first time span for the user device to transmit at least a data portion of a random-access procedure message to the base station overlaps the second time span;
determining, by the user device and based at least on the granted occasion being an occasion for the user device to transmit uplink data, a transmission precedence;
based on the determined transmission precedence, (i) transmitting the uplink data during the second time span, (ii) not transmitting the data portion of the random-access procedure message during the first time span, and (iii) not transmitting a preamble of the random-access procedure message before the first time span; and
overriding, by the processing hardware, one or more actions associated with unsuccessful iterations of the random-access procedure, the one or more actions including one or both of (i) increasing a preamble transmit power and (ii) incrementing a message transmission counter.

11. The method of claim 1, wherein:
the random-access procedure is a contention-based two-step random-access channel (RACH) procedure; and
the random-access procedure message is a message associated with a first step of the contention-based two-step RACH procedure.

12. The method of claim 11, wherein the data portion of the random-access procedure message comprises data in a physical-layer uplink channel (PUSCH) occasion of the message associated with the first step of the contention-based two-step RACH procedure.

13. A user device comprising hardware configured to:
receive, from a base station, a message that grants the user device an occasion to transmit uplink data, the occasion including a second time span configured for the user device to transmit uplink data to the base station;
determine that a first time span for the user device to transmit at least a data portion of a random-access procedure message to the base station overlaps the second time span;
determine a transmission precedence indicative of whether to modify transmission timing for the random-access procedure message or to instead modify transmission timing for the uplink data, wherein determining the transmission precedence is based at least on whether the granted occasion is (i) an occasion for the user device to re-transmit data or (ii) an occasion for the user device to transmit new data; and
based on the determined transmission precedence, only one of (i) transmit at least the data portion of the random-access procedure message to the base station during the first time span or (ii) transmit the uplink data to the base station during the second time span.

14. The user device of claim 13, wherein
the message that grants the user device an occasion to transmit uplink data configures resources for the user device to transmit uplink communications, and wherein the resources include the second time span.

15. The user device of claim 13, wherein:
the message that grants the user device the occasion to transmit uplink data is a message that grants an occasion for the user device to re-transmit data that the base station failed to receive or decode; and determining the transmission precedence is based at least on the granted occasion being an occasion for the user device to re-transmit data.

16. The user device of claim 15, comprising:

based on the determined transmission precedence, transmitting at least the data portion of the random-access procedure message to the base station during the first time span.

* * * * *